United States Patent [19]
Kobilan

[11] Patent Number: 5,685,384
[45] Date of Patent: Nov. 11, 1997

[54] DRIVING SYSTEM PROVIDING A RACING EXPERIENCE

[76] Inventor: Errol D. Kobilan, 13030 Meridian Rd., Elbert, Colo. 80106

[21] Appl. No.: 384,113

[22] Filed: Feb. 3, 1995

[51] Int. Cl.⁶ ..................................................... B60T 1/00
[52] U.S. Cl. ........................................... 180/65.1; 320/2
[58] Field of Search ..................... 180/65.1, 65.3; 273/86 R, 86 B; 439/34; 320/2; 272/85

[56] References Cited

U.S. PATENT DOCUMENTS

| | | | |
|---|---|---|---|
| 3,970,309 | 7/1976 | Sato | 273/86 B |
| 4,987,834 | 1/1991 | Peck, Jr. et al. | 104/300 |
| 5,184,694 | 2/1993 | Magrath, Jr. et al. | 180/168 |
| 5,462,439 | 10/1995 | Keith | 439/34 |
| 5,523,666 | 6/1996 | Hoelzl et al. | 320/2 |

Primary Examiner—Richard M. Camby
Attorney, Agent, or Firm—Timothy J. Martin; Michael R. Henson

[57] ABSTRACT

A driving system provides a track on which a plurality of electric carts may race. A charging station with a driveway is located proximately to the track so that the carts can be driven onto charging areas of the charging station and parked. Electrical terminals built into the charging areas are then contacted to recharge the carts. The track preferably has a wax layer on which the carts travel. The charging station is preferably a platform with an upper support surface, and electric cables are disposed below the upper surface and are thus protected against contact by the carts. The electrical contact on each cart may be provided by a movable arm that extends to engage the electrical terminals of the charging system. The carts are preferably provided with two independent motors, respectively, for forward and reverse motion.

20 Claims, 4 Drawing Sheets

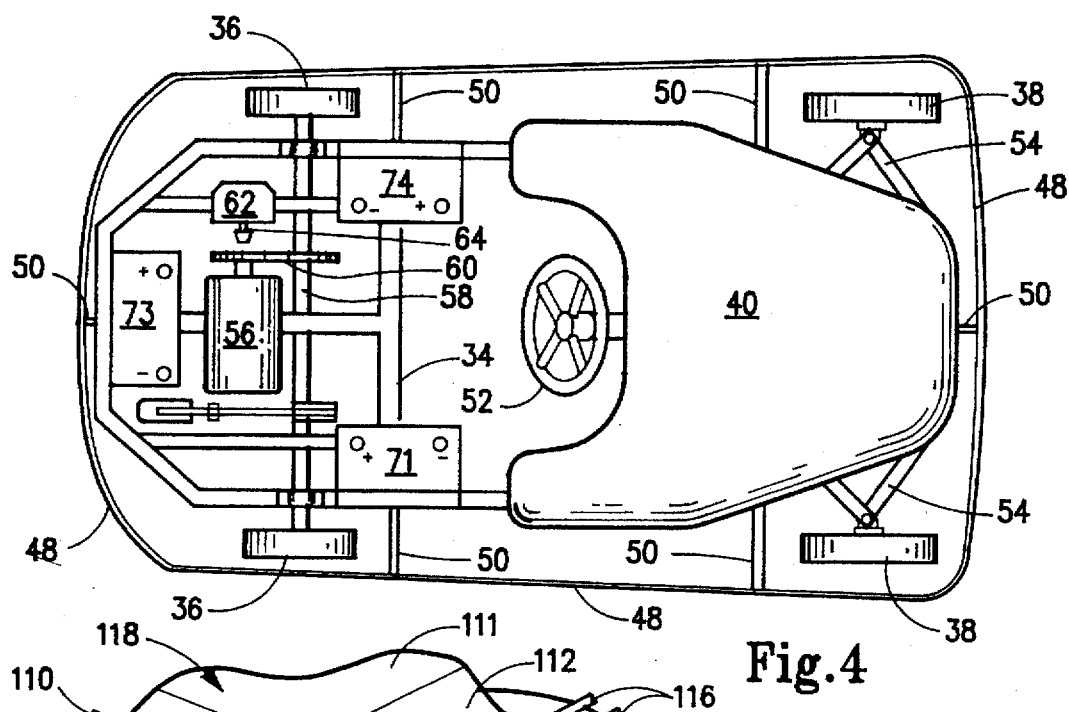
Fig.4
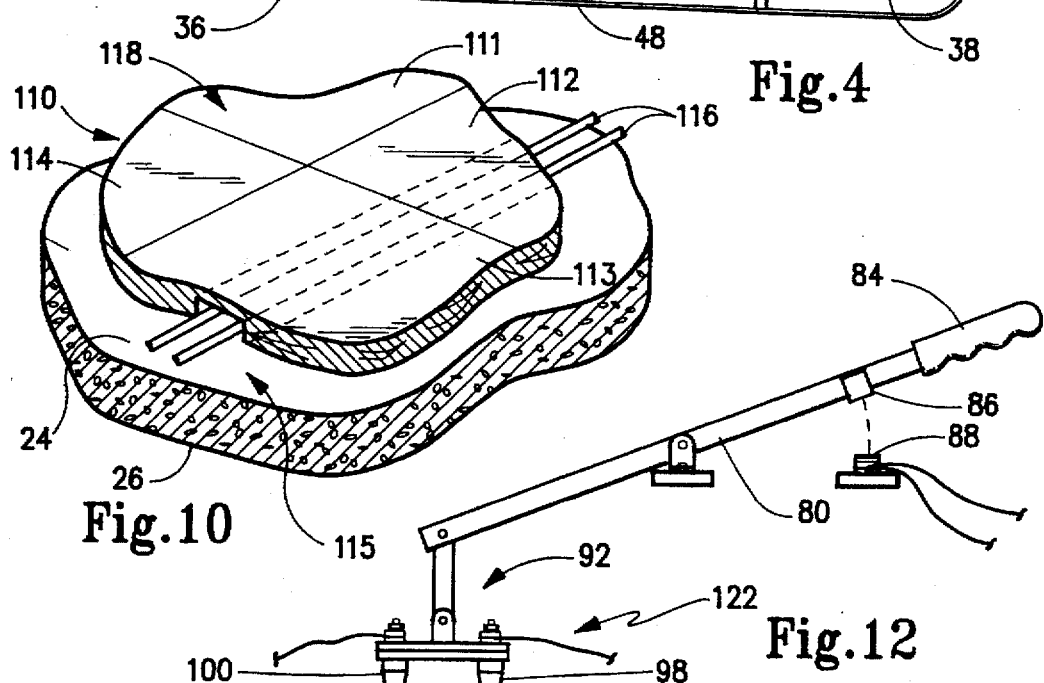
Fig.10
Fig.12
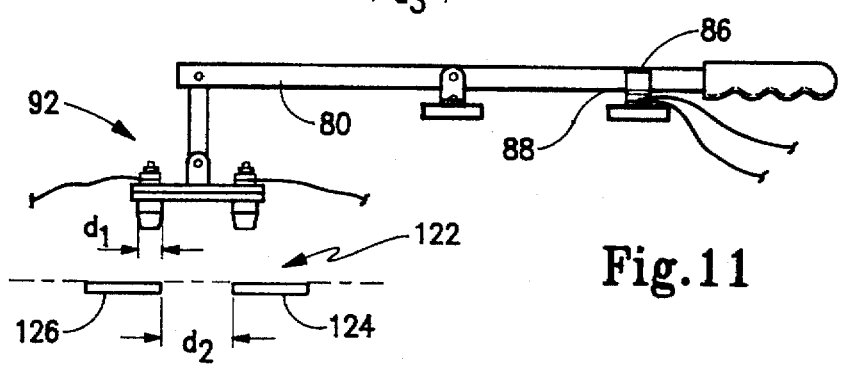
Fig.11

DRIVING SYSTEM PROVIDING A RACING EXPERIENCE

FIELD OF THE INVENTION

The present invention broadly concerns driving systems wherein one or more drivers steer powered miniature vehicles to provide a driving experience, especially a vehicle race. More specifically, however, the present invention is directed to electric go-cart driving systems of a type wherein a plurality of drivers steer their carts either together in a race or alone as a timed event.

BACKGROUND OF THE INVENTION

Since the advent of powered vehicles, especially the gasoline powered automobile, drivers have sought to pit their skill against other drivers in different types of racing situations. One of the most popular types of racing employs a closed looped race track around which a plurality of vehicles travel. The race is set for a designated number of "laps" and the first car to complete the selected number of laps wins the race.

Full scale racing, however, requires a high degree of skill and poses a substantial risk of injury and even death to the participants. Nonetheless, many non-expert drivers enjoy the thrill of racing and seek to test their skills in an entertaining and safe environment. For this reason, various driving systems, in the form of amusements, have been developed for public participation. A common example is known as the "go-cart". Here, a plurality of gas driven vehicles are constructed as small, low-powered carts. These carts are then driven around an asphalt race track, usually in the form of an oval or other design. Since these carts have an extremely low center of gravity and a wide wheel base relative to that center of gravity, the possibility of rolling the vehicle is minimized. Thus, should a driver lose control of his/her cart, it simply slips sideways rather than rolling in a sideways tumble. Bumpers and other protective buffers are provided around the perimeter of the track to minimize the risk of injury.

Typical go-carts and their corresponding race tracks have enjoyed wide-spread popularity, but have some disadvantages. First, these gas powered carts are typically quite noisy so that the ensemble of the racing carts may be quite loud to the ear. The use of gasoline engines is not very energy efficient, and it is quite common that these gasoline powered go-carts produce undesirable and unhealthy vapors. Furthermore, the gasoline engines can become quite hot so that there is always some risk of burns both to the drivers and the attendants who are staffing the go-cart facility. Finally, due to their production of exhaust, gasoline powered go-carts are not readily adaptable for indoor use; thus, use of go-carts are limited to locations or seasons that permit outdoor operation.

There has been some recognition that indoor operation of go-cart racing can be provided. Here, it has been known to employ electric carts to circle an indoor track in a covered facility. To enhance the driving experience, it has been known to make the indoor track slicker by applying talcum power to the surface. This requires that the drivers of the electric carts exercise a greater degree of skill. However, the power is somewhat undesirable due to its propensity to be dispersed into the air as well as to be lost from the surface of the race track. In addition, the charging of the battery pack for such electric carts has proved cumbersome. Here, the carts are typically parked between racing events, and staff then carries a charger to each individual cart. Thus, a haphazard array of electrical cables and wires are strewn across a charging area. This poses the threat of injury to the attendants and drivers of such electric carts. Furthermore, the recharging of such carts typically is inefficiency so that the interval between racing events is prolonged.

Accordingly, there remains a need for improved amusement facilities that employ safe yet exciting powered vehicles which can be driven by relatively unskilled drivers in a racing event. There is a need for such a driving system that can be implemented in both outdoor and indoor arenas so as not to be seasonally constrained. There is a further need for driving systems which emphasize driving skill as opposed to mere speed in teaching improved racing techniques.

SUMMARY OF THE INVENTION

It is an object of the present invention to provide a new and useful driving system adapted to simulate a racing experience.

Another object of the present invention is to provide a driving system utilizing electric carts that have a rapid recharging cycle time.

Another object of the present invention is to provide a driving system that may be used in indoor arenas as well as in outdoor arenas.

Yet another object of the present invention is to provide a driving system that is safe for inexperienced drivers yet which educates the drivers to improve their driving skills.

Still a further object of the present invention is to provide a driving system employing electric carts in a manner that minimize risks of injury to drivers and attendants.

A still further object of the present invention is to provide a driving system which can readily be assembled and disassembled for transport and storage.

To accomplish these objects, then, a driving system according to the present invention is provided and is adapted to provide a racing experience. In its broad form, this driving system include a plurality of electric carts which are each adapted to receive a human driver. These carts each include a frame, a set of rotatable wheels (front and back), a steering mechanism, a first electric motor operative to power the wheels so that the cart may move in a forward direction, a rechargeable battery pack which is in electrical communication with the motor and which is operative to store and provide electrical energy for powering the motor and an electric contact in electrical communication with the battery pack.

A track is provided in this driving system to form a raceway on which at least one but preferably a plurality of the carts travel during a racing event. A charging station is then located proximate to the track and has a driveway communicating with the track whereby carts which are drive on the track may be driven between the charging station and the track. This charging station includes a plurality of charging areas disposed on a support surface thereto and spaced from one another sufficiently so that one of the carts may be stored in each of the charging areas. Each of these charging areas are provided with a built-in electrical terminal adapted to be contacted by the electrical contact of a respective one of the carts which is stored thereon. A charging system is then associated with the charging station and is in electrical communication with the electrical terminals of the charging areas. The electrical charging system provides electrical current which can be concurrently supplied to the terminals so that the battery packs of a plurality of the carts may be simultaneously recharged when the respective electrical contacts are placed concurrently in contact with the electrical terminal of the respective charging area.

According to the preferred embodiment of the invention, the driving system employs a track that has a wax layer defining a racing surface on which the carts travel during the racing event. Preferably this wax layer is formed by melted steric acid which is adhered to a substrate surface such as concrete, asphalt and the like. The track is also formed as a continuous closed loop and has a width sufficient so that one cart may pass another without departing from the track surface. The driveway for the charging station, then, is formed to have an ingress portion so that the carts may be driven in a forward direction off of said track and onto the charging station and an egress portion such that the carts may be driven in the forward direction off of the charging station and onto the track.

The charging station is preferably formed by a low platform having a lower surface and a raised upper support surface for supporting the carts. The charging system then includes a plurality of electrical cables which are electrically connected to the terminals, with these electrical cables being located along protected wire paths disposed below the upper surface of the platform. In this manner, the cables are protected from contact with the wheels of the carts. To accomplish this, the lower surface of the platform includes a plurality of channels formed therein to define wire paths between the charging system and the terminals at each charging area. This platform may also be constructed as a plurality of panel sections which are connectable to one another to create the platform but which may be disassembled for transportation and storage.

In the preferred driving system, each of the racing carts includes a movable arm that supports the electrical contact associated with the cart so that this contact may be moved from a stowed position to an extended position. The cart then has a disabling switch that is operative to electrically isolate the motor from the battery pack when the electrical contact is in the extended position whereby the cart is disabled from moving in the forward direction under power from the motor. This disabling switch however is operative to enable the motor when the electrical contact is in the stowed position. Each of the terminals at the charging area is formed by at least one contact plate, but preferably two contact plates, which are disposed on the support surface such that, when one of the carts is positioned in a registered orientation relative to the respective charging area, the electrical contact of that cart will engage the contact plate when the electrical contact is in the extended position. It is preferred that the electrical contact for each cart be formed by a pair of probes to contact the pair of contact plates defining each terminal. These probes, and the associated contact plates thus form positive and negative terminals for the recharging of the battery packs. Here, it is also preferred that each charging area be provided with registration stripes for indicating when a cart is in the registered orientation so that the electrical contact may be placed in the extended position thereby to begin charging the battery pack. The contact plates are preferred to be aligned in the forward direction, with one plate being spaced in front of the other, that is, in tandem. Accordingly, the probes defining the electrical contact for each cart are in tandem, and the probes and the contact plates are sized and positioned such that neither of the first and second probes can simultaneously contact the first and second contact plates.

The charging areas are preferably organized as a matrix of rows and columns on the charging station, and it is preferred that the carts be organized in three groups corresponding to three columns of the matrix. Thus, one set of carts may participate in a racing event while the two other sets are being charged.

Each cart may also be provided with a second motor that is selectively engagable to power the respective cart in a reverse direction. This second motor drivably interconnected to the wheels in a manner such that the cart cannot obtain as great of speed in a rearward direction as in the forward direction.

Finally, the charging systems preferably includes a plurality of individual battery charges which are either in one to one correspondence with the charging areas so that there is separate battery charger for each charging area or wherein each of the battery charges provides electric current to a plurality of the charging areas.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 4 is a top plan view of the race car shown in FIG. 3 with the rear cowling removed;

FIG. 10 is a perspective view, broken away, showing a portion of the platform forming the charging station of FIGS. 7 and 8;

FIG. 11 is a side view in elevation showing the electrical contact and movable pivot arm of FIG. 6 positioned over the terminal of FIG. 9 with the contact in a stowed position; and FIG. 12 is a side view in elevation, similar to FIG. 11, but showing the contact the movable pivot arm in an extended position wherein electrical engagement is made with the terminal of FIG. 11.

DETAILED DESCRIPTION OF THE EXEMPLARY EMBODIMENT

The present invention concerns a driving system adapted to provide a racing event. This driving system broadly includes a race track, electrical racing carts and a charging station for recharging the battery packs used with the electric carts. As such, the present invention is directed to a race track that may be located either in an indoor or outdoor arena so that persons may drive the electric carts as an amusement that comprises a racing event and thereby enhance their driving skills in the simulated race-like environment.

Figures 1, 2, 3:
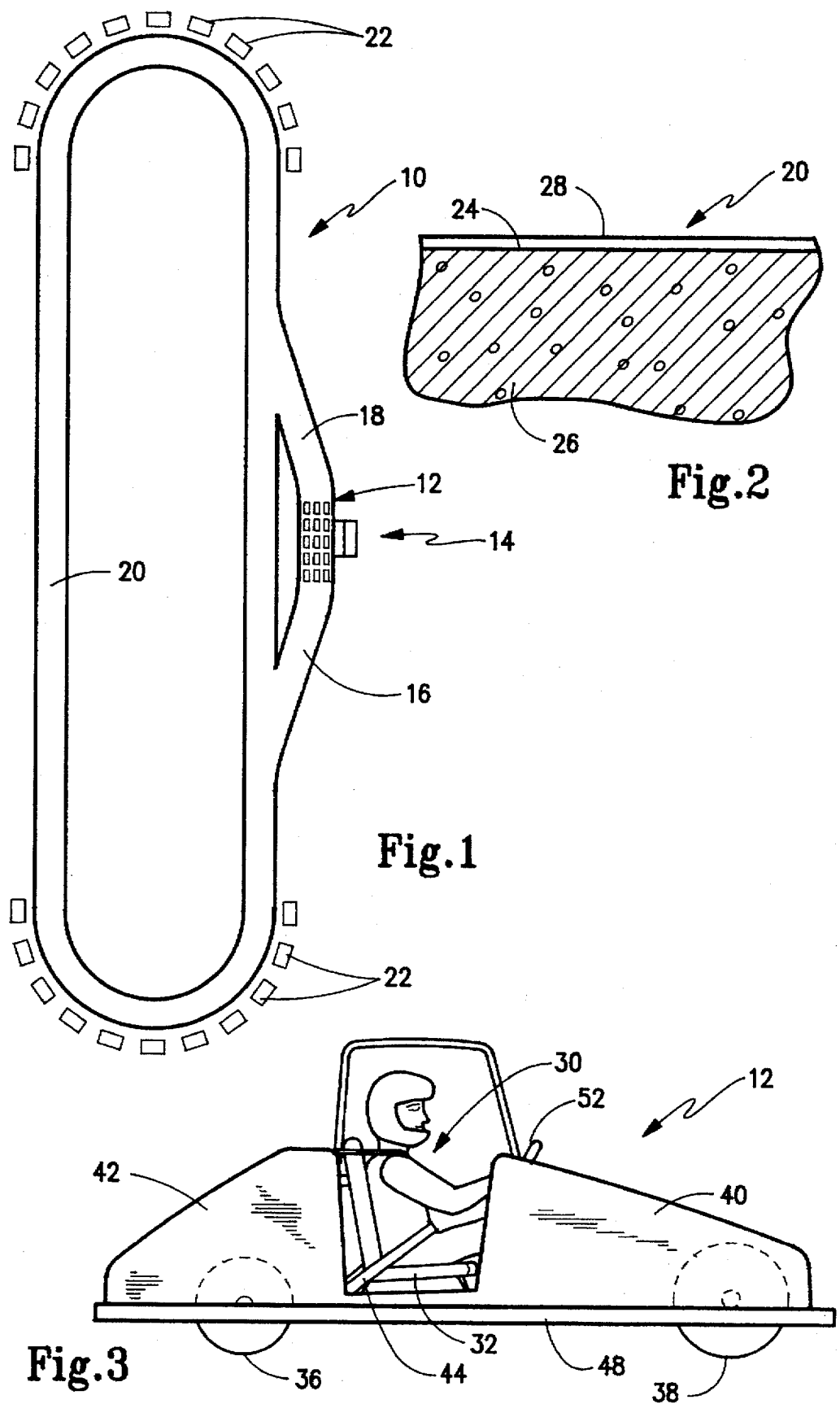
FIG. 1 is a top plan view diagramming the driving system according to the exemplary embodiment of the present invention.
FIG. 2 is a cross-sectional view of the portion of the track used in the driving system shown in FIG. 1.
FIG. 3 is a side view In elevation of a racing cart used in the driving system shown in FIG. 1.

Accordingly, as is shown in FIG. 1, a diagram of the driving system according to the exemplary embodiment of the present invention is shown. Here, driving system 10 includes a plurality of electric carts 12 which are shown in FIG. 1 to be arranged in a matrix of six rows and three columns on a charging station 14. The carts in each column thus define a group that, as described below, may typically be raced simultaneously. Charging station 14 has a driveway including an ingress portion 16 and an egress portion 18 so that carts 12 may be driven off of and onto track 20 for a racing event. Track 20 is preferably a closed loop that defines a raceway upon which at least one of carts 12 travel during a racing event. In FIG. 1, this closed loop is in the form of a traditional oval, but any convenient configuration of track 20 may be employed. Various protective buffers 22, such as straw bales, are disposed proximately to the turns of track 20 so that, should a cart slide off of track 20, buffers 22 will act to reduce the likelihood of injury to the cart or to the driver.

Figure 8:
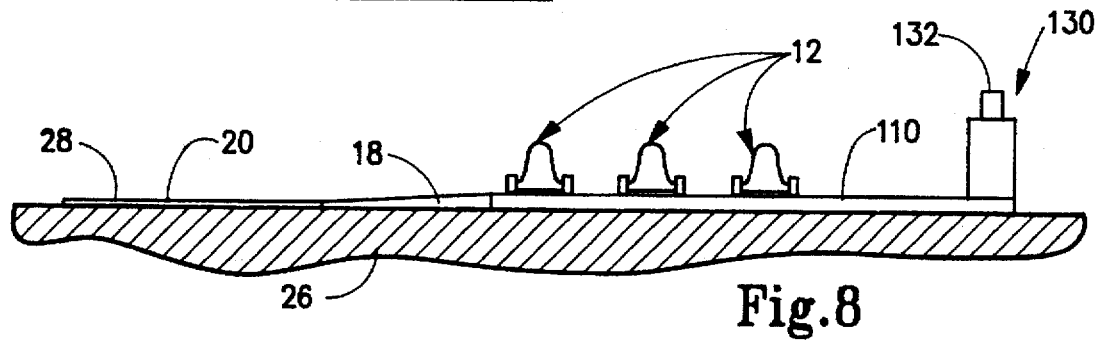
FIG. 8 is an end view in partial cross-sectional view showing the charging station and a portion of the track for the driving system shown in FIGS. 1 and 7.
Figure 9:
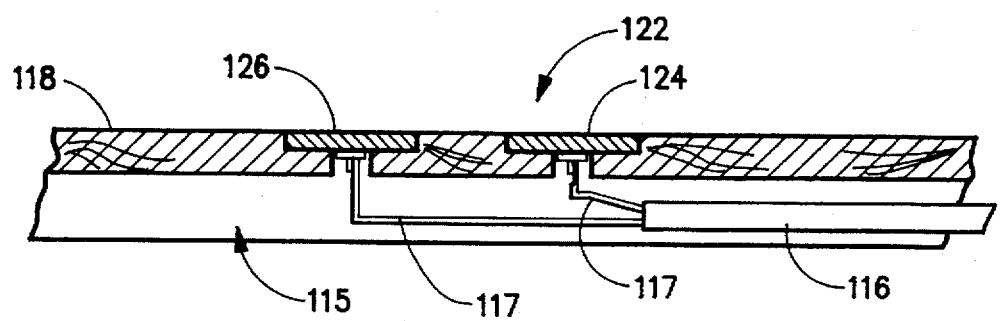
FIG. 9 is an enlarged side view in cross-section showing a pair of contact plates forming a terminal for a charging area of the charging station shown in FIGS. 7 and 8.

As is shown in FIGS. 2 and 8, track 20 defines a raceway that is disposed on the upper surface 24 of a substrate, such as concrete substrate 26. Track 20 is preferably in the form of a wax layer that defines the racing surface 28 opposite substrate 26 over which carts 12 travel. Preferably, track 20 is constructed of melted steric acid that may be applied to surface 24 of substrate 26 as granules that are then melted by a flame torch.

A representative racing cart 12 is shown in FIGS. 3 and 4 where it may be seen that such cart 12 is adapted to receive a human driver 30 on seat 32 thereof. Seat 32 is supported by means of a framework 34 which also serves to support the other structural elements of cart 12. To this end, a plurality of wheels, such as rear wheels 36 and front wheels 38 are rotatably journaled on framework 34, as is well-known in the art. A front cowling 40 encloses a forward portion of cart 12 while rear cowling 42 encloses a rear portion of cart 12. A five-point safety belt system 44 is secured to framework 34 and extends around the driver 30, and a roll bar cage 46 extends over and around driver 30. In order to protect against damage due to collisions, a spring steel bumper 48 extends around a majority of race car 12 and is held in position by means of support rods 50 secured to framework 34. Steering wheel 52 interconnects with appropriate steering mechanism 54 so that electric cart 12 may be directionally guided as it travels either in a forward or rearward direction.

With reference to FIG. 4, it may be seen at a first electric motor 56 is mounted on framework 34 and is mechanically coupled to axle 58 that drives rear wheels 36 by means of a coupling belt 60 so that activation of first motor 56 causes electric cart 12 to move in a forward direction. A second electric motor 62 is provided and includes a throw shaft 64 which, upon activation of motor 62, advances into engagement with coupling belt 60 so as to reversibly drive wheels 36. Second motor 62 may be a typical starter motor such as used with automobiles which have such a throw shaft 64, as is known in the art. In any event, it is preferred that second motor 62 when coupled to axle 58 drives wheels 36 at a reduced rate of speed relative to the rate of speed at which first motor 56 is able to drive wheels 36 in the forward direction. A plurality of batteries 71, 72 and 73 are electrically connected in series and form a rechargeable battery pack that is in electrical communication with both first motor 56 and second motor 62. This battery pack formed by batteries 71–73 is operative to store electrical energy for powering the motors.

Figure 5:
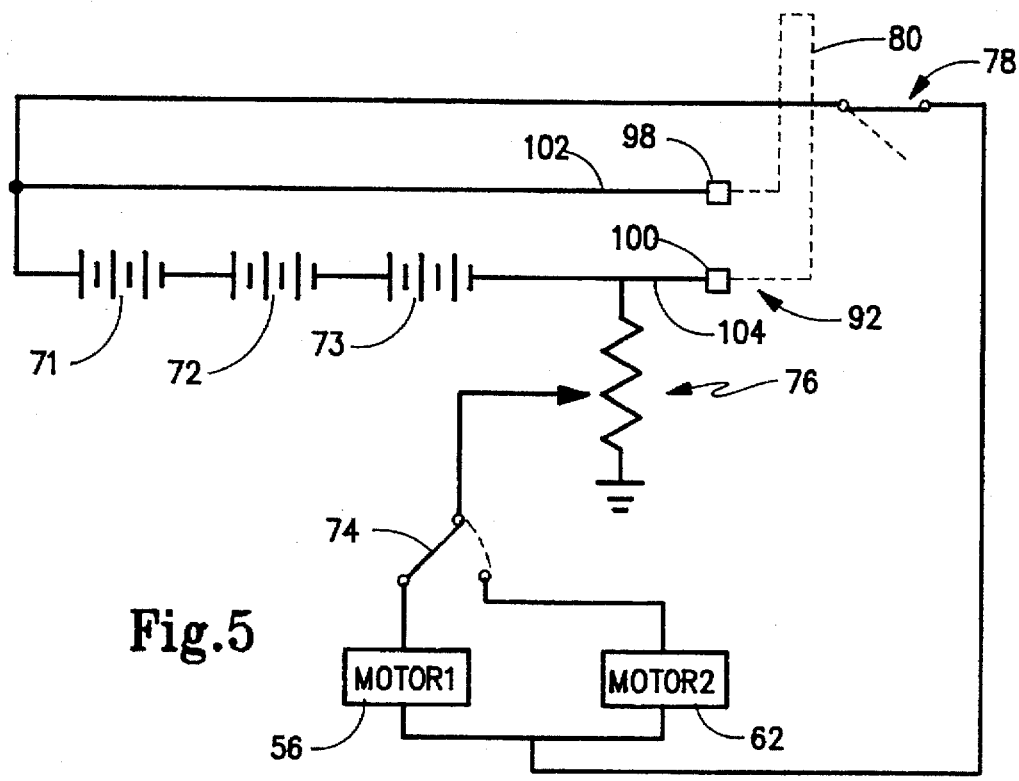
FIG. 5 is a circuit diagram of an exemplary electric circuit for the cart of FIGS. 3 and 4.

An electric circuit for the powering system is shown in FIG. 5. In FIG. 5 it may be seen that electrical power from batteries 71–73 may selectively be presented to either motor 56 or motor 62 by means of switch 74. In either event, however, power is provided to motors 56, 62 through a rheostat 76 which is connected to the accelerator pedal (not shown) of cart 12. Rheostat 76 allows the speed of cart 12 to be varied in both the forward and reverse directions. The circuit is complete, however, only if interrupt switch 78 is in the closed position.

Figure 6:
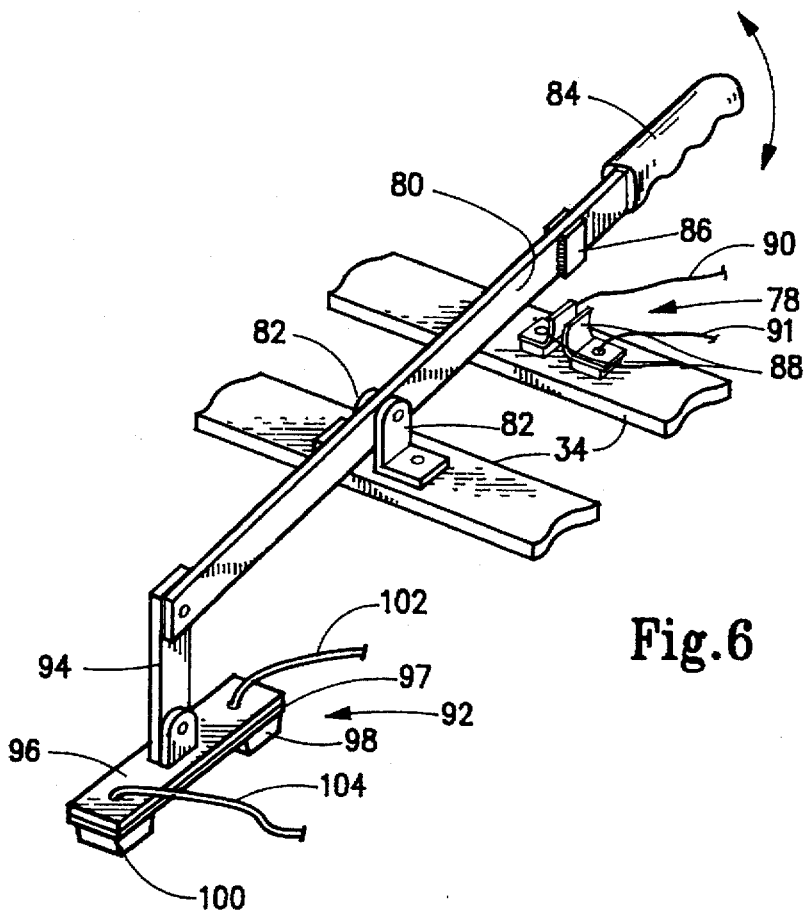
FIG. 6 is a perspective view of the electrical contact and removable positioning arm therefor for the cart shown in FIGS. 3 and 4.

One example of the structure of interrupt switch 78 is shown in FIG. 6 wherein it may be seen that a movable pivot arm 80 is pivotally connected to framework 34 by means of a pair of opposed ears 82. A first end of pivot arm 80 is provided with a handle portion 84, and an electrical contact 86 in the form of a U-shaped copper bracket ends around arm 80 at a location proximate to handle 84. Switch 78 is in the form of a pair of wings 88 which are suitably insulated from framework 34 but are provided with connecting wires 90, 91. As described below, when arm 80 is pivoted to advance contact 86 between wings 88, switch 78 is closed thereby completing the circuit to either of motors 56, 62 depending upon the position of switch 74. Electrical contact 92 is pivotally mounted to a second end of arm 80 opposite handle 84 by means of a link 94. A contact plate 96 is then pivotally secured to link 94 and carries a pair of probes 98, 100 which are arranged in tandem and which are respectively connected to wires 102, 104. Probes 98, 100, as described below, are insulated from plate 96 by insulating gasket 97 and are provided so that batteries 71–73 may conveniently be connected for recharging. With reference again to FIG. 5, it may be seen that probes 98, 100 of electrical contact 92 are in electrical communication with battery pack formed by batteries 71–73.

Figure 7:
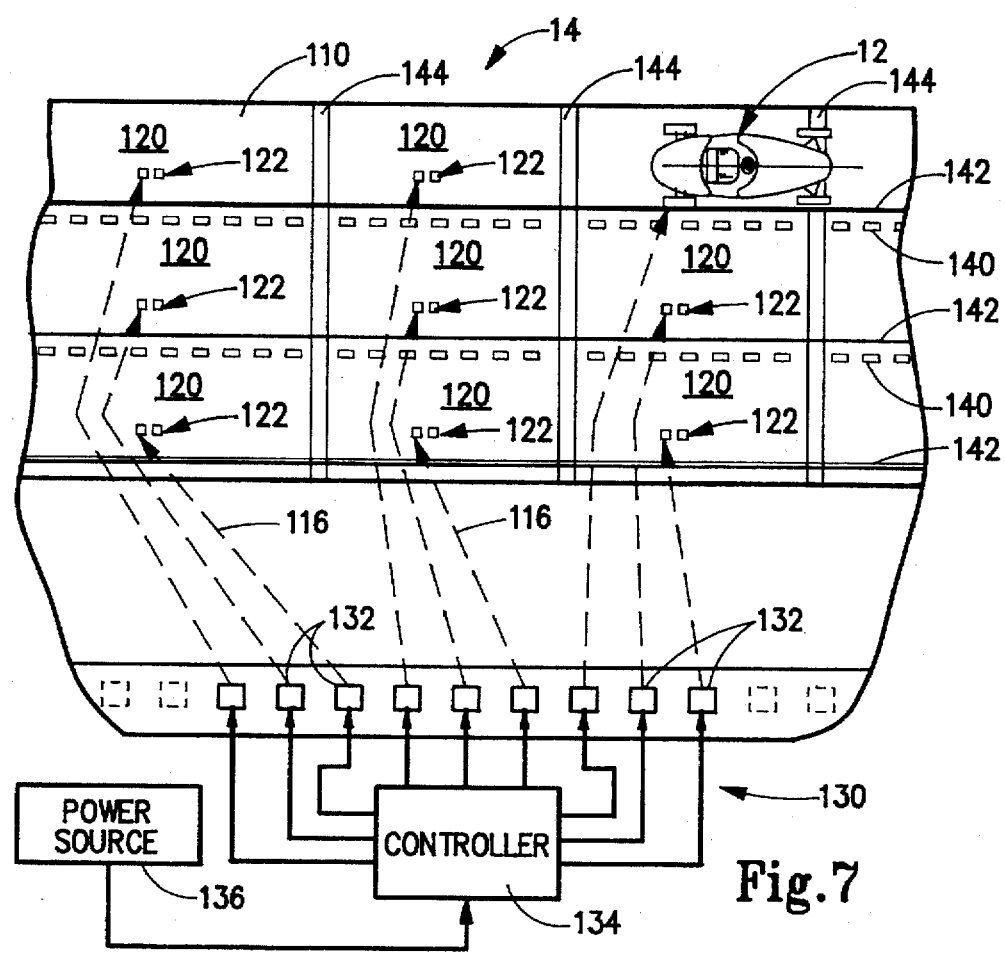
FIG. 7 is a top view diagramming the charging station employed with the driving system of FIG. 1.

Charging station 14 may now be better described with reference to FIGS. 1 and 7–10. Charging station 14 is preferably in the form of an elevated platform 110 which may be conveniently formed out of particle board approximately ¾" thick. With reference to FIG. 10, it may be seen that platform 110 is formed by a plurality of sections such as panels 111–114 at least some of which are provided with lower opening cable channels such as cable channel 115 through which charging cables 116 may be routed. Panels 111–114 allow for easy disassembly of platform 110 for storage and transport as well as easy reassembly. With reference again to FIGS. 1, 7 and 8, and as noted above, charging platform 14 is divided into a plurality of charging areas, such as charging areas 120 which are organized in a matrix of six rows and three columns. Each of charging areas 120 thus are located on the upper support surface 118 of platform 110, and each is provided with a built in electrical terminal 122 best shown in FIG. 9. Charging areas 120 are sized and spaced such that a respective cart 12 may be parked on each separate charging area 120. Electrical terminals 122 are each formed by a pair of contact plates 124, 126 arranged in tandem, that is, one behind the other in the forward direction. Contact plates 124, 126 are preferably brass plates inset relative to upper support surface 118 and are in electrical communication with charging cable 116 by means of wires 117. An electrical charging system 130 includes a plurality of charges, such as charges 132 which are electrically connected to terminals 122 by means of charging cables 116, as is shown in FIG. 7. chargers 132, for example, may be six by six volt chargers of the type often sued to recharge electric golf carts. A controller 134 selects the activation and deactivation of chargers 132 so that they receive a charging current from power source 136.

With reference now to FIGS. 11 and 12, it may be seen that, when a respective cart 12 is properly registered in a charging area 120, its electrical contact 92 may receive electrical power from terminal 122. In FIG. 11, it may be seen that electrical contact 92, when in the withdrawn position, is positioned in spaced relation above terminal 122. In this position, pivot arm 80 is in a horizontal position so that contact 86 bridges the gap between wings 88. Hence, electrical power may be supplied from batteries 171–173 to the selected motor 56, 62. When handle 84 is raised, however, electrical contact 92 is lowered so that probes 98 and 100 may respectively contact plates 124, 126. In this position, contact 86 is withdrawn from wings 88 to open the circuit between batteries 71–73 and motors 56, 62 thus disabling cart 12 from forward or rearward movement under the power provided by the motors since these motors may no longer receive electrical current from the battery pack. The movement of contact 92 into the extended position shown in FIG. 12 furthermore establishes electrical communication between terminal 122 (and thus charger 132) and batteries 71–73 so that batteries 71–73 may be charged by receiving electrical current from power source 136. Correspondingly, movement of pivot arm 80 from the position shown in FIG. 12 back to the stowed position shown in FIG. 11 disconnects the charging circuit and reactivates the electrical circuit for cart 12 so that motors 56, 62 may again power wheels 36. It should be understood that any suitable mechanical assembly for extending and stowing contact 92 may be used without departing from the scope of this invention.

Turning again to FIG. 7, it may be seen that several registration stripes are provided to separate charging areas 120 and to help align each respective cart 12 with the appropriate terminal 122. Here, it may be seen that broken stripes 140 operate to separate the columns of the matrix of charging areas 120 and act as guides for the steering of carts 12 in the charging station, that is, on the upper surface 118 of platform 110. Striped lines 142 are provided so that a driver steers his/her respective car 12 so that the right ones of wheels 38, 36 follow the appropriate stripe 42 and are positioned thereon. The driver then places both front wheels 38 in position on transverse stripes 144. In this position, the respective contact 92 of cart 12 is positioned above and is oriented for movement into electrical engagement with terminal 122. Here, also, it should be appreciate in reference to FIGS. 11 and 12, that the width "$d_1$" of each probe 98, 100 is less than the spacing "$d_2$" between each of contacts 124, 126 of terminal 122. Thus, neither of probes 98, 100 may bridge the separation between contacts 124, 126 and thus short out the charging circuit. Moreover, the distance "$d_3$" between probes 98, 100 is larger than the separation distance "$d_2$" so that probes 98, 100 may span the separation distance "$d_2$" to make simultaneous but respective contact with plates 124, 126.

From the foregoing, it may be seen that driving system 10 provides a very useful and pleasurable arena for enjoying a racing experience. In operation, it is preferred that carts 12 be grouped into three groups of four to six cars each according to the columns of the matrix of charging areas. After all of the cars are fully charged, a selected group, corresponding to a column, may be activated and may be driven for an interval of time. Meanwhile, the other two groups of cars 12 may remain in electrical contact with charging system 130 so that their appropriate battery packs are fresh. The first group may then be returned to the appropriate column and reconnected to the charging system 130 for simultaneous recharging while a second group is employed for another racing event. Upon completion of this event, the second group may be returned and the third group utilized for still a further racing event while the first two groups are recharged.

From the foregoing, it should be understood by the ordinarily skilled person in this art that the batteries selected for the battery packs as well as the battery chargers 132 should be complimentary. Preferably, batteries 71–73 are deep cycle twelve volt "marine-type" batteries that can be completely discharged and yet rapidly recharged. Battery chargers 132 may be in one-to-one correspondence with each charging area 120 so that there is one battery charger for each charging area 120. Alternatively, and providing that chargers 132 are of sufficient capacity, each charger 132 may concurrently supply two or more charging areas 120 and controller 132 may selectively route charging current to the appropriate terminals 122. In any event, the electrical connection and circuitry may be configured as desired and within the skill of the ordinary engineer.

In any event, though, it should be appreciated that the use of the built in electrical terminals 122 as well as the routing channels 115 in the bottom surface of platform 110 permit electrical connection without the need to move either charges 132 or to provide charging cables that extend across the upper surface 118 of platform 110 which would otherwise oppose the risk of accident or injury. By providing routing channels 115, charging cables 116 are thus protected from the wheels 36, 38 of carts 12 as well as from the feet of persons who may staff the facility of driving system 10.

Finally, by providing track 20 as a strip of melted steric acid, a stable yet slippery surface is presented. this race way requires greater skill by the drivers of carts 12. To this end, it should be appreciated that front wheels 38 are larger In diameter than rear wheels 36 to provide for better steering control. Moreover, wheels 38 are knobbed tires for better steering traction.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A driving system adapted to provide a racing experience, comprising:

(a) a plurality of electric carts each adapted to receive a human driver seated therein, each of said carts including a frame, a set of rotatable wheels, a steering mechanism, a first electric motor operative to power said wheels so that said cart moves in a forward direction, a rechargeable battery pack in electrical communication with said motor and operative to store electrical energy for powering said motor, and an electrical contact in electrical communication with said battery pack;

(b) a track forming a raceway on which at least one of said carts travel during a racing event said track having a wax layer defining a surface on which said carts travel during the racing event;

(c) a charging station located proximately to said track and having a driveway communicating with said track whereby said carts may be driven between said charging station and said track, said charging station having a plurality of charging areas disposed on a support surface thereof and spaced from one another sufficiently so that one of said carts may be parked at each of the charging areas, each of the charging areas provided with a built-in electrical terminal adapted to be contacted by the electrical contact of a respective one of said carts parked thereon; and (d) an electrical charging system associated with said charging station and in electrical communication with the electrical terminals of each of the charging areas whereby electrical current can be supplied to the terminals whereby the battery packs of said carts may be recharged when the respective electrical contacts are placed concurrently in contact with the electrical terminal of the respective charging area.

2. A driving system according to claim 1 wherein said wax layer is formed by melted steric acid.

3. A driving system according to claim 1 wherein said track is formed as a continuous closed loop.

4. A driving system according to claim 1 wherein said driveway has an ingress portion whereby said carts may be driven in a forward direction off of said track and onto said charging station and an egress portion whereby said carts may be driven in the forward direction off of said charging station and onto said track.

5. A driving system adapted to provide a racing experience, comprising:

(a) a plurality of electric carts each adapted to receive a human driver seated therein, each of said carts including a frame, a set of rotatable wheels, a steering mechanism, a first electric motor operative to power said wheels so that said cart moves in a forward direction, a rechargeable battery pack in electrical communication with said motor and operative to store electrical energy for powering said motor, and an electrical contact in electrical communication with said battery pack;

(b) a track forming a raceway on which at least one of said carts travel during a racing event;

(c) a charging station formed by a platform having a lower surface and a raised upper surface for supporting said carts, said charging station located proximately to said track and having a driveway communicating with said track whereby said carts may be driven between said charging station and said track, said charging station having a plurality of charging areas disposed on the upper surface thereof and spaced from one another sufficiently so that one of said carts may be parked at each of the charging areas, each of the charging areas provided with a built-in electrical terminal adapted to be contacted by the electrical contact of a respective one of said carts parked thereon; and (d) an electrical charging system associated with said charging station and including a plurality of electrical cables electrically connected to said terminals of each of the charging areas whereby electrical current can be supplied to the terminals whereby the battery packs of said carts may be recharged when the respective electrical contacts are placed concurrently in contact with the electrical terminal of the respective charging area, said electrical cables located along wire paths disposed below the upper surface of said platform so that said cables are protected from contact with the wheels of said carts.

6. A driving system according to claim 5 wherein the lower surface of said platform has a plurality of channels formed therein to define said wire paths.

7. A driving system according to claim 5 wherein said platform is constructed of a plurality of panel sections connectable to one another.

8. A driving system adapted to provide a racing experience, comprising:

(a) a plurality of electric carts each adapted to receive a human driver seated therein, each of said carts including a frame, a set of rotatable wheels, a steering mechanism, a first electric motor operative to power said wheels so that said cart moves in a forward direction, a rechargeable battery pack in electrical communication with said motor and operative to store electrical energy for powering said motor, an electrical contact in electrical communication with said battery pack and a movable arm that supports said electrical contact for movement from a stowed position to an extended position;

(b) a track forming a raceway on which at least one of said carts travel during a racing event;

(c) a charging station located proximately to said track and having a driveway communicating with said track whereby said carts may be driven between said charging station and said track, said charging station having a plurality of charging areas disposed on a support surface thereof and spaced from one another sufficiently so that one of said carts may be parked at each of the charging areas, each of the charging areas provided with a built-in electrical terminal adapted to be contacted by the electrical contact of a respective one of said carts parked thereon; and (d) an electrical charging system associated with said charging station and in electrical communication with the electrical terminals of each of the charging areas whereby electrical current can be supplied to the terminals whereby the battery packs of said carts may be recharged when the respective electrical contacts are placed concurrently in contact with the electrical terminal of the respective charging area.

9. A driving system according to claim 8 wherein each said cart includes a disabling switch that is operative to electrically isolate said motor from said battery pack when said electrical contact is in the extended position whereby said cart is disabled from moving in the forward direction under power from said motor yet is operative to enable said motor when said electrical contact is in the stowed position.

10. A driving system according to claim 8 wherein each of said terminals is formed by at least one contact plate disposed on the support surface such that, when one of said carts is positioned in a registered orientation relative to the respective charging area, the electrical contact on said one will contact said contact plate when the electrical contact is in the extended position.

11. A driving system according to claim 10 wherein each of the charging areas includes registration stripes for indicating when a cart is in the registered orientation.

12. A driving system according to claim 10 wherein each of said terminals is formed by a pair of contact plates disposed on and recessed into the support surface with a first one of said contact plates being located forwardly of a second one of said contact plates relative to a cart positioned in the registered orientation of the respective charging area, each of said electrical contacts on said carts being formed by a first probe located forwardly of a second probe whereby said first probe and second probes will respectively engage said first and second contact plates when the electrical contact is the extended position and with the respective cart in the registered orientation.

13. A driving system according to claim 12 wherein said first and second contacts of each terminal and said first and second probes of each cart are sized and positioned such that neither of the first and second probes can simultaneously contact the first and second contact plates.

14. A driving system adapted to provide a racing experience, comprising:
  (a) a plurality of electric carts each adapted to receive a human driver seated therein, each of said carts including a frame, a set of rotatable wheels, a steering mechanism, a first electric motor operative to power said wheels so that said cart moves in a forward direction, a second electric motor that is selectively engageable for powering said cart in a reverse direction, a rechargeable battery pack in electrical communication with said motor and operative to store electrical energy for powering said motor, and an electrical contact in electrical communication with said battery pack;
  (b) a track forming a raceway on which at least one of said carts travel during a racing event;
  (c) a charging station located proximately to said track and having a driveway communicating with said track whereby said carts may be driven between said charging station and said track, said charging station having a plurality of charging areas disposed on a support surface thereof and spaced from one another sufficiently so that one of said carts may be parked at each of the charging areas, each of the charging areas provided with a built-in electrical terminal adapted to be contacted by the electrical contact of a respective one of said carts parked thereon; and
  (d) an electrical charging system associated with said charging station and in electrical communication with the electrical terminals of each of the charging areas whereby electrical current can be supplied to the terminals whereby the battery packs of said carts may be recharged when the respective electrical contacts are placed concurrently in contact with the electrical terminal of the respective charging area.

15. A driving system according to claim 14 wherein said second motor is selectively engageable with said wheels of a respective cart.

16. A driving system according to claim 5 wherein each of said terminals is formed by at least one contact plate disposed on the upper surface such that, when one of said carts is positioned in a registered orientation relative to the respective charging area, the electrical contact on said one will contact said contact plate.

17. A driving system according to claim 16 wherein each of the charging areas includes registration stripes for indicating when a cart is in the registered orientation.

18. A driving system adapted to provide a racing experience, comprising:
  (a) a plurality of electric carts each adapted to receive a human driver seated therein, each of said carts including a frame, a set of rotatable wheels, a steering mechanism, a first electric motor operative to power said wheels so that said cart moves in a forward direction, a rechargeable battery pack in electrical communication with said motor and operative to store electrical energy for powering said motor, and an electrical contact in electrical communication with said battery pack;
  (b) a track forming a raceway on which at least one of said carts travel during a racing event;
  (c) a charging station located proximately to said track and having a driveway communicating with said track whereby said carts may be driven between said charging station and said track, said charging station having a plurality of charging areas disposed on a support surface thereof and spaced from one another sufficiently so that one of said carts may be parked at each of the charging areas, each of the charging areas provided with a built-in electrical terminal adapted to be contacted by the electrical contact of a respective one of said carts parked thereon; and
  (d) an electrical charging system associated with said charging station and in electrical communication with the electrical terminals of each of the charging areas whereby electrical current can be supplied to the terminals whereby the battery packs of said carts may be recharged when the respective electrical contacts are placed concurrently in contact with the electrical terminal of the respective charging area, said charging system including a plurality of individual battery chargers, said chargers each being in one-to-one correspondence with the charging areas so that there is a separate battery charger for each of the charging areas.

19. A driving system adapted to provide a racing experience, comprising:
  (a) a plurality of electric carts each adapted to receive a human driver seated therein, each of said carts including a frame, a set of rotatable wheels, a steering mechanism, a first electric motor operative to power said wheels so that said cart moves in a forward direction, a rechargeable battery pack in electrical communication with said motor and operative to store electrical energy for powering said motor, and an electrical contact in electrical communication with said battery pack;
  (b) a track forming a raceway on which at least one of said carts travel during a racing event;
  (c) a charging station located proximately to said track and having a driveway communicating with said track whereby said carts may be driven between said charging station and said track, said charging station having a plurality of charging areas disposed on a support surface thereof and spaced from one another sufficiently so that one of said carts may be parked at each of the charging areas, each of the charging areas provided with a built-in electrical terminal adapted to be contacted by the electrical contact of a respective one of said carts parked thereon; and
  (d) an electrical charging system associated with said charging station and in electrical communication with the electrical terminals of each of the charging areas whereby electrical current can be supplied to the terminals whereby the battery packs of said carts may be recharged when the respective electrical contacts are placed concurrently in contact with the electrical terminal of the respective charging area, said charging system including a plurality of individual battery chargers, each of said chargers providing electric current to a plurality of said charging areas.

20. A driving system adapted to provide a racing experience, comprising:
  (a) a plurality of electric carts each adapted to receive a human driver seated therein, each of said carts including a frame, a set of rotatable wheels, a steering mechanism, a first electric motor operative to power said wheels so that said cart moves in a forward direction, a rechargeable battery pack in electrical communication with said motor and operative to store electrical energy for powering said motor, and an electrical contact in electrical communication with said battery pack;

(b) a track forming a raceway on which at least one of said carts travel during a racing event;

(c) a charging station located proximately to said track and having a driveway communicating with said track whereby said carts may be driven between said charging station and said track, said charging station having a plurality of charging areas disposed on a support surface thereof and organized as a matrix of rows and columns, said charging areas spaced from one another sufficiently so that one of said carts may be parked at each of the charging areas, each of the charging areas provided with a built-in electrical terminal adapted to be contacted by the electrical contact of a respective one of said carts parked thereon; and (d) an electrical charging system associated with said charging station and in electrical communication with the electrical terminals of each of the charging areas whereby electrical current can be supplied to the terminals whereby the battery packs of said carts may be recharged when the respective electrical contacts are placed concurrently in contact with the electrical terminal of the respective charging area.

* * * * *